H. JONES & J. T. VINCENT.
COTTON COMPRESS MACHINERY.
APPLICATION FILED APR. 24, 1908.
908,676.
Patented Jan. 5, 1909.
6 SHEETS—SHEET 2.
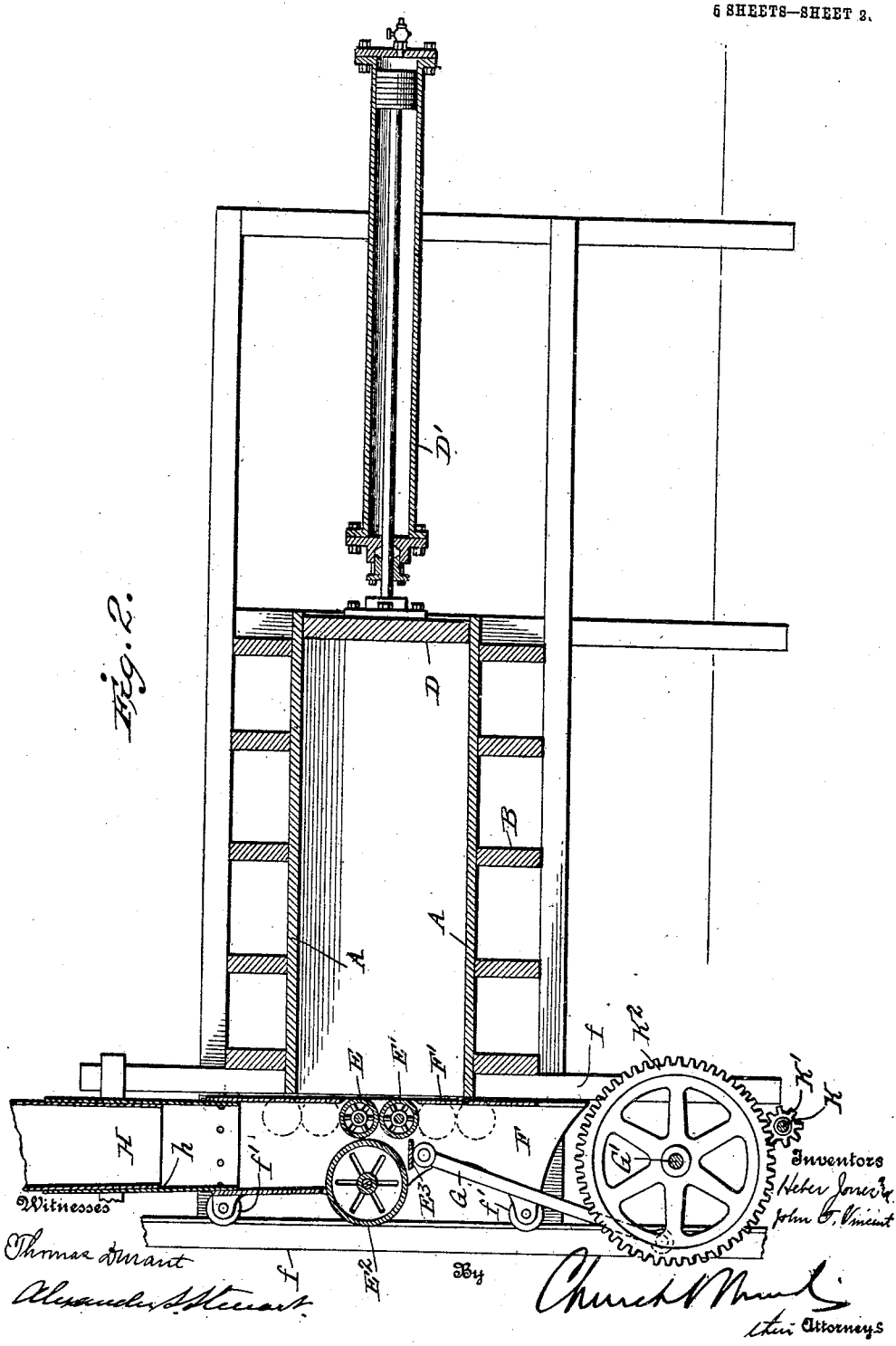

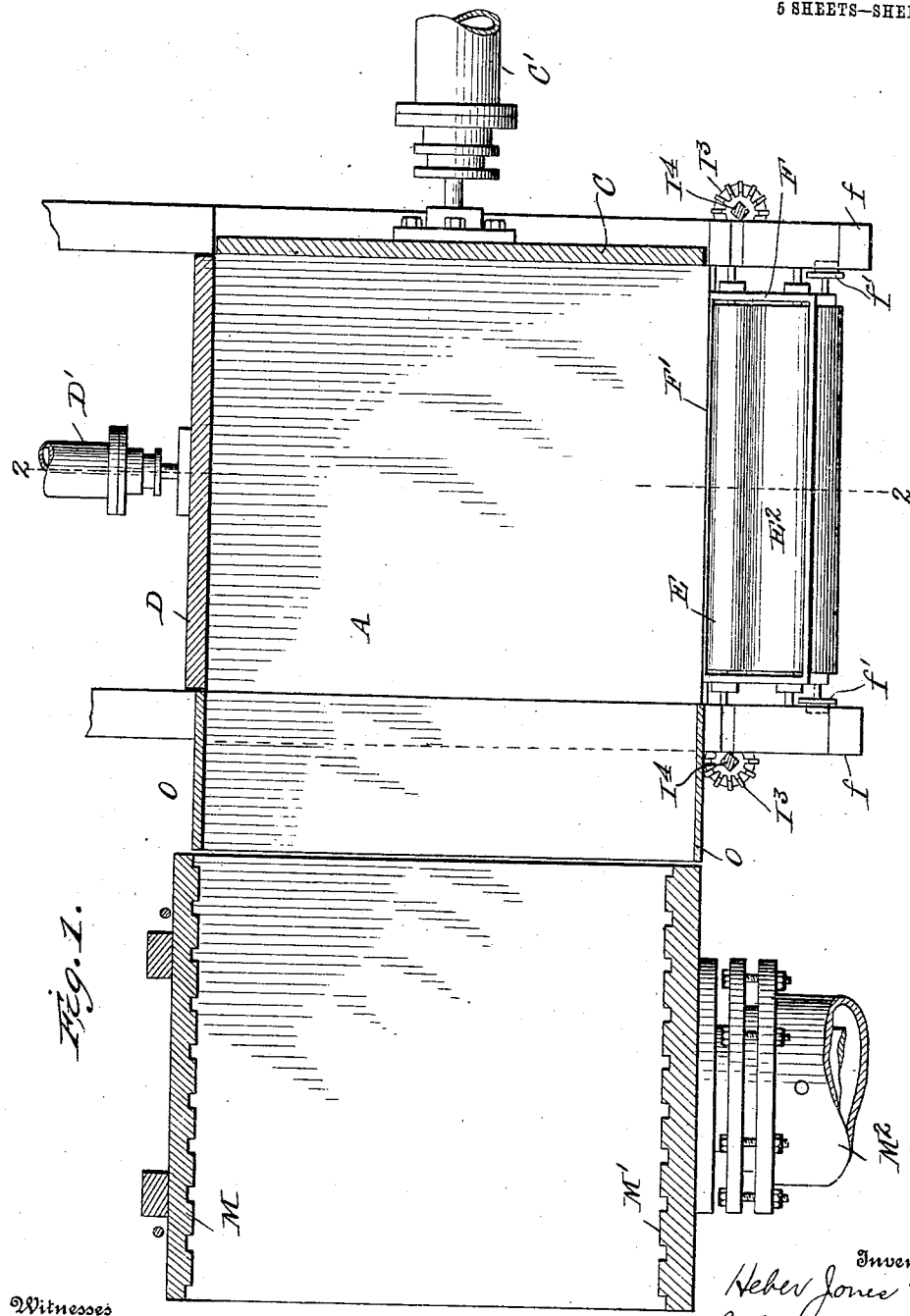

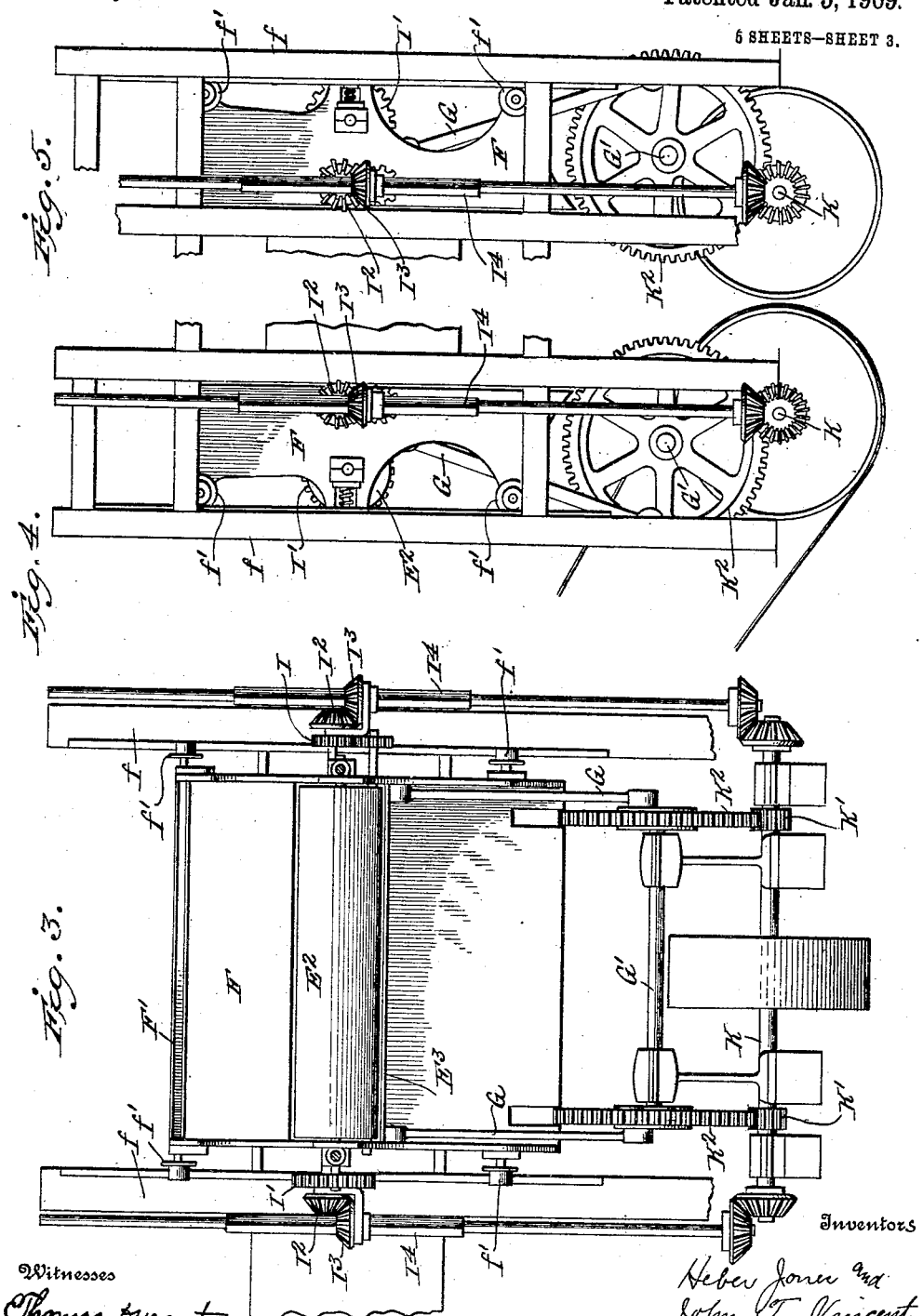

H. JONES & J. T. VINCENT.
COTTON COMPRESS MACHINERY.
APPLICATION FILED APR. 24, 1908.
908,676.
Patented Jan. 5, 1909.
5 SHEETS—SHEET 4.
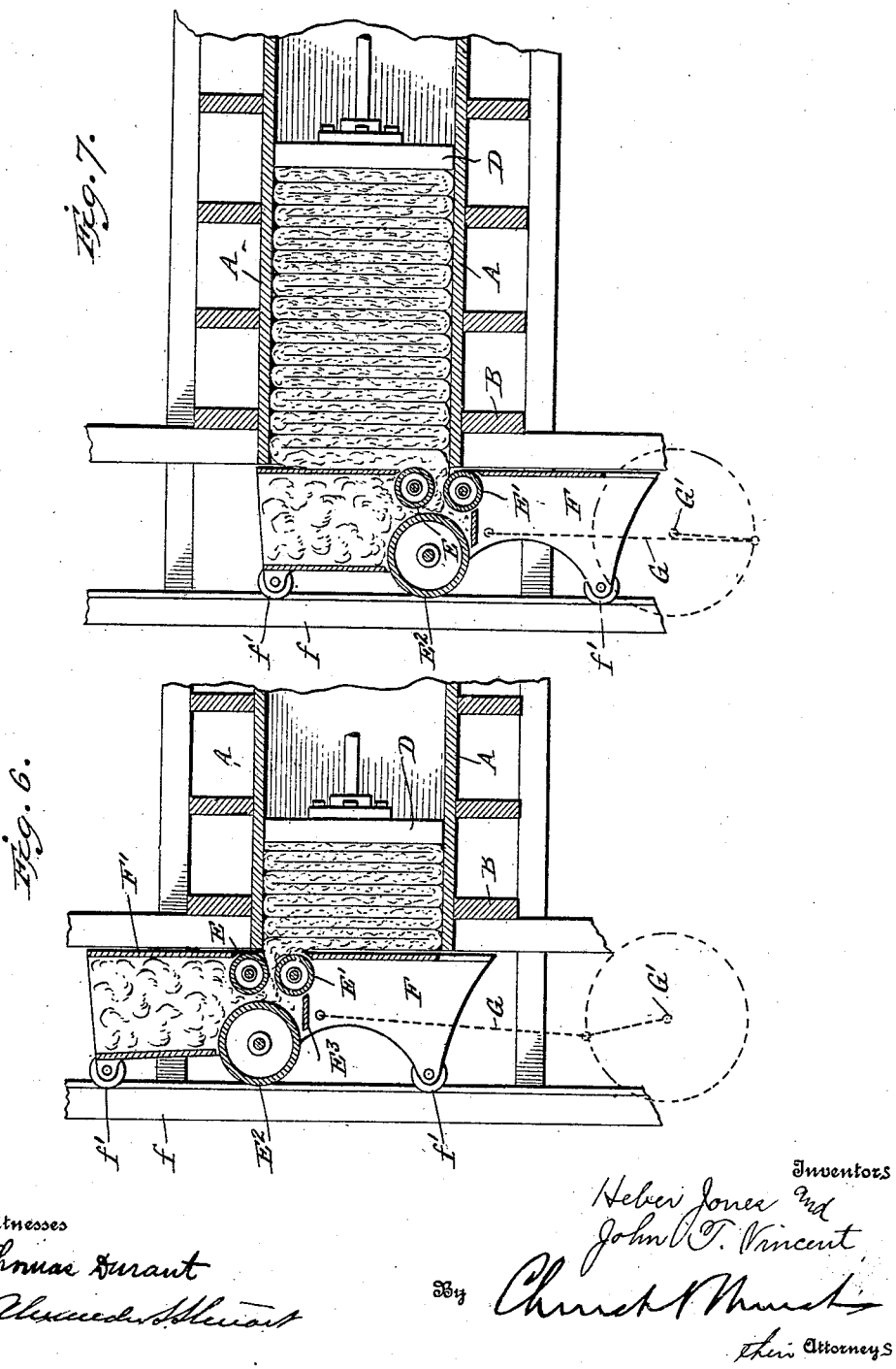

H. JONES & J. T. VINCENT.
COTTON COMPRESS MACHINERY.
APPLICATION FILED APR. 24, 1908.

908,676.

Patented Jan. 5, 1909.

5 SHEETS—SHEET 5.

Witnesses

Inventors
Heber Jones
John T. Vincent,
By
Their Attorneys

UNITED STATES PATENT OFFICE.

HEBER JONES AND JOHN T. VINCENT, OF MEMPHIS, TENNESSEE.

COTTON-COMPRESS MACHINERY.

No. 908,676.    Specification of Letters Patent.    Patented Jan. 5, 1909.

Application filed April 24, 1908. Serial No. 429,015.

*To all whom it may concern:*

Be it known that we, HEBER JONES and JOHN T. VINCENT, citizens of the United States, residing at Memphis, in the county of Shelby and State of Tennessee, have invented certain new and useful Improvements in Cotton - Compress Machinery; and we do hereby declare the following to be a full, clear, and exact description of the same, reference being had to the accompanying drawings, forming a part of this specification, and to the figures and letters of reference marked thereon.

This invention relates to compressing apparatus, particularly such as is designed for baling and compressing cotton and similar fibrous material, the objects of the invention being to provide an apparatus which shall be economical both to manufacture and operate and with which the loose fiber may be given the desired bale formation and density before being tied off and discharged from the apparatus.

As illustrated in the accompanying drawings, the apparatus is especially designed for taking the cotton as it is discharged from the gins, forming the same into a bat, and simultaneously with the formation of the bat distributing the same uniformly in a bale chamber while giving to the bale in process of formation a preliminary condensation. The bale thus formed and partly compressed is then operated upon by compressor heads without being released from its confining walls, and is finally tied off and discharged from the apparatus.

The invention consists in certain novel details of construction and combinations and arrangements of parts, all of which will now be described and pointed out particularly in the appended claims.

Figure 10:
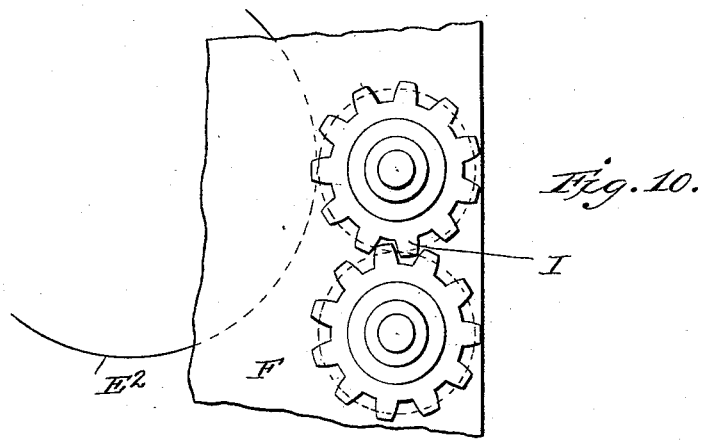
Figure 9:
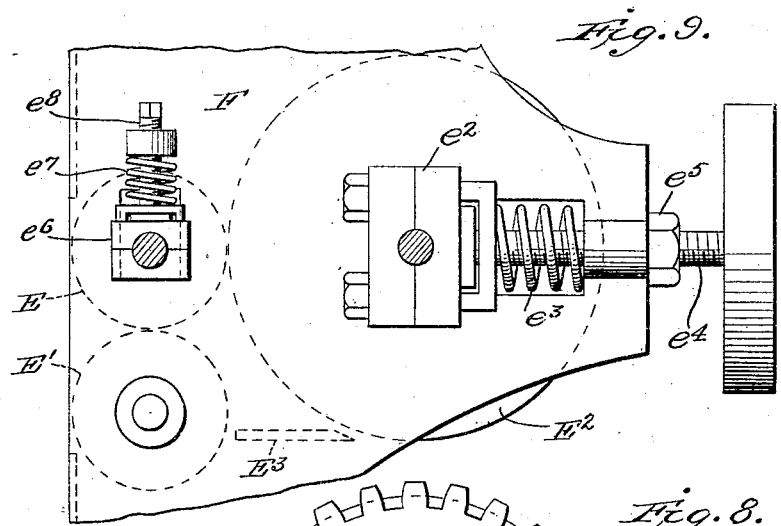
Figure 8:
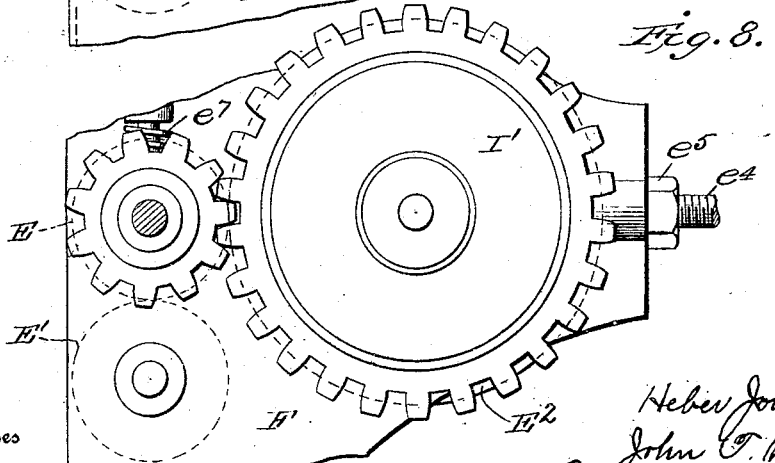

Referring to said drawings: Figure 1 is a sectional plan view with portions of the apparatus broken away in order that the parts may be shown on a somewhat larger scale. Fig. 2 is a vertical section taken in the plane of the line 2—2, in Fig. 1. Fig. 3 is an elevation looking at the left hand end of the parts shown in Fig. 2. Figs. 4 and 5 are elevations looking at opposite ends of the parts shown in Fig. 3. Figs. 6 and 7 are diagrammatic sectional views showing the operation of the mechanism in forming the cotton into a bat and compressing the same into a bale chamber. Figs. 8, 9, and 10 are detail elevations of the driving connections for the feed rolls.

Like letters of reference in the several figures indicate the same parts.

The preliminary bale chamber of the apparatus illustrated, is provided with fixed top and bottom walls A, supported by suitable framing B, the details of which it is unnecessary to describe. One of the side walls of the bale chamber is formed by a movable platen C, adapted to be actuated by a power cylinder C', while one of the end walls of the chamber is formed by a movable platen D, adapted to be actuated by a power cylinder D'. The opposite end wall of the chamber is formed by the feeding mechanism through which the cotton bat is fed into the chamber, and this feeding mechanism is adapted to be given a reciprocatory movement vertically across the end of the chamber in order to lay the bat in transverse folds, as will hereinafter appear.

The bat forming and feeding mechanism consists essentially of relatively small feeding rolls E and E', arranged one above the other and a relatively large feed roll $E^2$, arranged in rear of the rolls E, E', all of said rolls being journaled in a vertically movable carriage F, actuated or reciprocated by pitmen G, extending downwardly and connected with cranks on a countershaft G'. The carriage F and the feeding mechanism carried thereby are held in place and properly guided by vertically extending guide ways $f$, and to prevent undue frictional resistance, flanged rollers $f'$ may be journaled on the frame in position to ride against the outer guide ways, as will be readily understood.

The front wall F' of the carriage F forms the end wall of the bale chamber, except at the point where the feed rolls E, E' are located and the group of feed rolls, together with a bottom deflector $E^3$, forms the lower end of a chute H, through which the cotton is fed from the gin. A telescopic connection $h$, or other desired means for permitting the lower end of the chute to move vertically, is provided and the whole arrangement is such that cotton supported on the feed rolls will be formed into a bat and fed by the same through between the rolls and into the bale chamber. To effect this movement of the cotton successfully, the said rolls must be positively driven and in the same direction at all contacting or fiber gripping points, for which purpose the rolls E, E' are geared together, as at I in Fig. 10, and rotate in unison at relatively high speed. The shaft of the roll E is provided at its ends with bevel gear wheels $I^2$, Fig. 3, adapted to mesh with corresponding gear wheels $I^3$, slidably mounted on vertically arranged drive shafts $I^4$. The shafts $I^4$ derive their movement from a power shaft K, which latter also, through pinions K' and gear wheels $K^2$, operates to drive the countershaft G', hereinbefore referred to.

The large feed roll $E^2$ is provided at one end with a gear wheel I', meshing with a corresponding gear wheel on the shaft of roller E, thus in operation, the cotton passing down through the chute H will normally rest on the feed rollers E, $E^2$, and will be fed by the latter downwardly and finally in between the rolls E, E' in the form of a bat, which will be distributed in vertical folds back and forth across the face of the bale in process of formation and by providing for a resistance to the entrance of the cotton into the bale chamber any desired condensation may be effected.

In the operation of the apparatus the movable head D is held advanced by a yielding pressure, and is adapted to be forced back against such pressure by the entrance of the cotton into the bale chamber, as is well illustrated in Figs. 6 and 7, where the feeding mechanism is shown at opposite extremes of its travel, and the bat of cotton formed by the feeding mechanism is laid in transverse vertical folds in the bale chamber.

By making the feed movement of the rolls positive and their surface speed greater than the speed of movement of the carriage in which the feed rolls are mounted, there is a constant pressure of condensation on the cotton after its passage through between the feed rolls, a result which could not be secured were the surface feed of the feed rolls only equal to or less than the speed of the carriage in which they are mounted. As the result of this arrangement not only is the gradual pressure effective in condensing the cotton to the desired degree, but there is little or no tendency of the cotton to be drawn out in an attenuated bat or to be dragged out of shape or position in the bale by the movement of the feeding mechanism across the end face of the bale.

To avoid difficulty and possible breakage should solid obstructions find their way into the feeding mechanism with the cotton, as well as to insure the gripping of the cotton by the feed rolls, the latter are preferably spring pressed, thus as shown in Fig. 9 the roll $E^2$ is mounted in movable boxes $e^2$, adapted to be advanced by a spring $e^3$, and to be controlled in its forward movement by a screw $e^4$, having a set nut $e^5$. The roll E is similarly mounted in movable bearings $e^6$, held advanced by a spring $e^7$, and controlled by a screw $e^8$.

The feeding mechanism is operated to feed cotton into the bale chamber until a bale of the desired length and density has been formed, after which the movement of the feeding mechanism is arrested, and the plunger C' is advanced to move the formed bale transversely out of the press chamber to a position between heads M, M' of a compressor. Said heads M, M' are controlled by a power cylinder $M^2$ and are adapted to operate on the bale in the same direction as that in which the bale was condensed in its preliminary formation. Obviously, the compressor heads M, M' should occupy a position at one side of and close to the press chamber, although a communicating passage formed by walls O may be arranged as a transverse extension of the press chamber and the heads M, M' may, when in their open position, form continuations of the walls O.

Obviously, either steam or hydraulic cylinders may be employed, but in the preferred arrangement the transfer cylinder is steam actuated inasmuch as the transfer process should be quickly accomplished in order that the operation of the feeding mechanism may be interrupted for as short a period as possible. The cylinders D' and $M^2$ may well be hydraulic cylinders of ordinary construction inasmuch as their movements are relatively slow and the pressure exerted by them somewhat greater than in the case of the transfer cylinder.

While the particular driving mechanism for the feed rolls and carriage set forth herein is preferred, we do not wish to be limited thereto inasmuch as other connections between the drive shaft and the bodily movable feed rolls may be used effectively, but in all cases the movement of the carriage and the rate of rotation of the feed rolls should be correlated in order that the condensing action of the feed rolls shall be effective and at all times have a tendency to force the bat into the bale chamber at equal or greater speed than the movement of the carriage across the end face of the chamber.

Having thus described the invention, what is claimed is:

1. In an apparatus such as described, the combination with the horizontally arranged bale chamber, resistance head movably mounted in said chamber, and means for resisting the outward movement of said head of a feed mechanism embodying a vertically movable carriage forming the lower end of a feed chute, feed rolls mounted in said carriage on horizontal axes, means for reciprocating said carriage vertically, and means for positively rotating said feed rolls in opposite directions at a higher surface speed than the rate of travel of the carriage across the end of the bale chamber.

2. In an apparatus such as described, the combination with the bale chamber and movable head yieldingly supported therein, of a reciprocatory carriage forming the end wall of said chamber opposite said yielding head, feed rolls journaled in said carriage in position to feed fibrous material into the bale chamber, means for positively reciprocating the carriage and feed rolls across the end of the bale chamber, and means for positively driving said feed rolls in a direction to feed the fiber into the bale chamber at a speed greater than the movement of the carriage.

3. In an apparatus such as described, the combination with the horizontally arranged bale chamber and yieldingly supported head working therein, of a carriage mounted to reciprocate vertically and forming the wall of said chamber opposite the yielding head, horizontally arranged feed rolls discharging horizontally through the carriage into said chamber, a third feed roll coöperating with one of said first mentioned feed rolls to form a support for the bottom of a column of fiber, and a deflector for preventing the escape of cotton passing between the supporting feed rolls, substantially as described.

4. In an apparatus such as described, the combination with the bale chamber and yieldingly supported head working therein, of a reciprocatory bat forming mechanism constituting one wall of the chamber opposite the yielding head, and mechanism for positively operating said bat forming mechanism to feed the bat into the bale chamber at a speed greater than the speed of the movement of the carriage, whereby the bat is kept under compression during the formation of the bale.

5. In an apparatus such as described, the combination with the bale chamber, movable head yieldingly supported therein, and reciprocatory carriage, of feed rolls journaled in said carriage to discharge into the chamber, gearing interposed between said feed rolls, a drive shaft extending parallel to the line of movement of the carriage, a connection between said shaft, and feed rolls slidably mounted on the shaft for positively rotating the rolls toward each other during the reciprocation of the carriage, a power shaft and driving connections for reciprocating the carriage.

6. In an apparatus such as described, the combination with the bale chamber and movable head yieldingly supported therein, of a reciprocatory carriage and a bat forming and feeding mechanism mounted in said carriage and embodying feed rolls journaled on axes arranged in substantially triangular relation to each other, whereby two of said rolls form the support for a column of fiber and two of said rolls force the formed bat into the bale chamber.

7. In an apparatus such as described, the combination with the bale chamber and movable head yieldingly supported therein, of the vertically reciprocatory carriage, the bat forming and feeding rolls mounted in said carriage, the supply chute, a telescopic connection between said supply chute and carriage, and means for positively reciprocating the carriage and for positively rotating the rolls at a surface speed greater than the rate of movement of the carriage.

HEBER JONES.
JOHN T. VINCENT.

Witnesses:
 Louis Leroy,
 Geo. R. Livermore.